United States Patent
Minarik (10) Patent No.: US 10,489,432 B2
(45) Date of Patent: Nov. 26, 2019

(54) RECORDING AND SHARING TRAVEL EXPERIENCES

(71) Applicant: Follow Me L.L.C., Las Vegas, NV (US)

(72) Inventor: Joseph Minarik, Sammamish, WA (US)

(73) Assignee: FOLLOW ME L.L.C., Las Vegas, NV (US)

( * ) Notice: Subject to any disclaimer, the term of this patent is extended or adjusted under 35 U.S.C. 154(b) by 0 days.

(21) Appl. No.: 16/122,513

(22) Filed: Sep. 5, 2018

(65) Prior Publication Data
US 2019/0073381 A1    Mar. 7, 2019

Related U.S. Application Data (60) Provisional application No. 62/555,554, filed on Sep. 7, 2017.

(51) Int. Cl.
| | | |
|---|---|---|
| *H04W 24/00* | (2009.01) | |
| *G06F 16/29* | (2019.01) | |
| *H04W 4/021* | (2018.01) | |
| *G06Q 50/30* | (2012.01) | |
| *G06Q 50/00* | (2012.01) | |
| *H04W 4/18* | (2009.01) | |

(52) U.S. Cl.
CPC ............ *G06F 16/29* (2019.01); *G06Q 50/01* (2013.01); *G06Q 50/30* (2013.01); *H04W 4/021* (2013.01); *H04W 4/185* (2013.01)

(58) Field of Classification Search
CPC .. H04W 4/02; H04W 64/00; H04L 29/08657; H04L 29/08108; H04L 29/08936; G01S 5/0252; G01S 5/02; G01S 5/14; G01S 5/0263; G01S 5/0242; G01S 17/48; G01S 5/16; H04M 1/72572; G01C 21/20
See application file for complete search history.

(56) References Cited

U.S. PATENT DOCUMENTS

| | | | |
|---|---|---|---|
| 9,418,482 B1 | 8/2016 | Yang et al. | |
| 2006/0270421 A1 | 11/2006 | Phillips et al. | |
| 2010/0075712 A1* | 3/2010 | Sethuraman | H04M 1/6041 455/556.1 |
| 2011/0121964 A1 | 5/2011 | Bannard | |
| 2016/0086332 A1* | 3/2016 | Chen | G06T 19/20 345/419 |

(Continued)

OTHER PUBLICATIONS

International Search Report and Written Opinion dated Dec. 20, 2018 for International Application No. PCT/US2018/049776 in 7 pages.

*Primary Examiner* — Dai Phuong
(74) *Attorney, Agent, or Firm* — Womble Bond Dickinson (US) LLP; Daniel E. Ovanezian (57) ABSTRACT

A user device monitors geo-locations inside and outside of a geographic radius boundary. The user device records geo-locations and information outside of the geographic radius boundary and inside after an elapsed time period. Information and geo-locations from the user device may be shared with others. An application server obtains geo-tagged information from the user device and determines whether geo-tagged information of other user devices share similar characteristics. The server generates a list of geo-locations the user of the user device may want to visit based on related attributes of other user devices.

18 Claims, 10 Drawing Sheets

(56) References Cited

U.S. PATENT DOCUMENTS

2018/0061230 A1\* 3/2018 Madigan ................. G08G 1/095
2018/0084374 A1\* 3/2018 Jain ......................... H04W 4/14
2019/0256334 A1\* 8/2019 High ......................... A47F 3/08

\* cited by examiner

RECORDING AND SHARING TRAVEL EXPERIENCES

CROSS-REFERENCE TO RELATED APPLICATIONS

This application claims the benefit of U.S. Provisional Patent Application Ser. No. 62/555,554, filed Sep. 7, 2017, the contents of which are hereby incorporated by reference.

TECHNICAL FIELD

The present teachings relate to methods for recording and sharing travel experiences, and more particularly to systems utilizing geo-tagged information for purposes of recording trips and sharing trip information globally, individually, or keeping it private.

BACKGROUND

Travel applications rely on location-based services in order for consumers to record and share travel and life experiences using a mobile device. Information tagged with geographical positioning is useful for determining similar travel experiences among users. Efficient methods of recording and sharing trips are lacking among leading travel applications (e.g., Trip Advisor, Four Square, Snapchat). As such, location-based services have a number of uses in determining when to begin recording information for a trip and comparing the information with other users' information for determining future locations to visit.

BRIEF DESCRIPTION OF THE DRAWINGS

The present disclosure is illustrated by way of example, and not by way of limitation, in the figures of the accompanying drawings.

DETAILED DESCRIPTION

Embodiments are described for recording and sharing travel experiences of a user. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Figure 1:
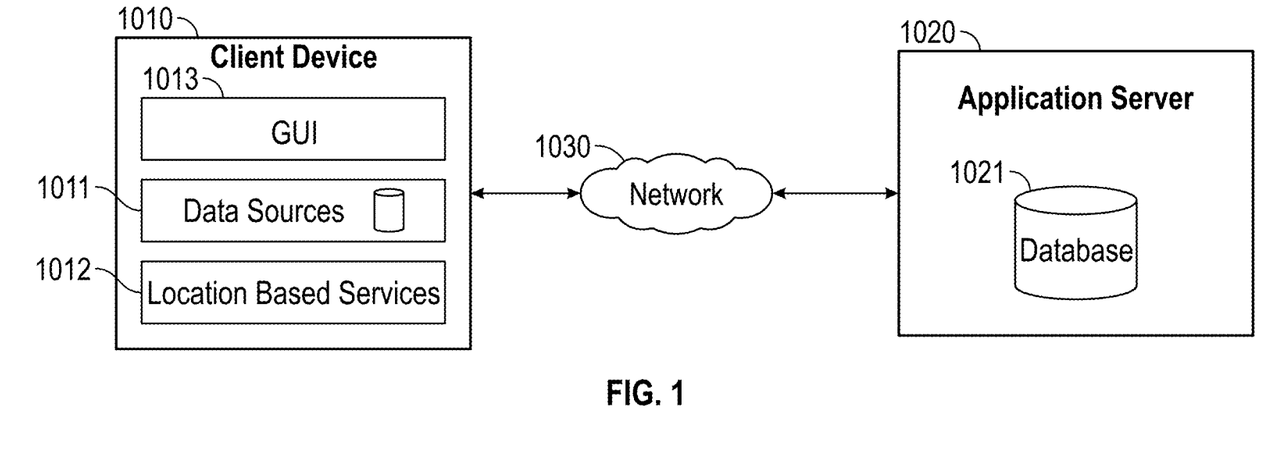
FIG. 1 is a block diagram illustrating a computing environment for client device communication with an application server over a network, according to an embodiment.

FIG. 1 is a block diagram illustrating a computing environment for client device communication with an application server over a network, according to an embodiment. The computing environment includes a client device 1010 and an application server 1020 that are communicatively coupled through network 1030. The client device 1010 includes components such as a data source 1011 to store data discussed herein, software for implementing the location based services methods 1012 discussed herein, and a graphical user interface (GUI) 1013 for presenting and receiving information from a user. The application server 1020 includes components such a database 1021 to store data received from and sent to client 1010 discussed herein.

Figure 2:
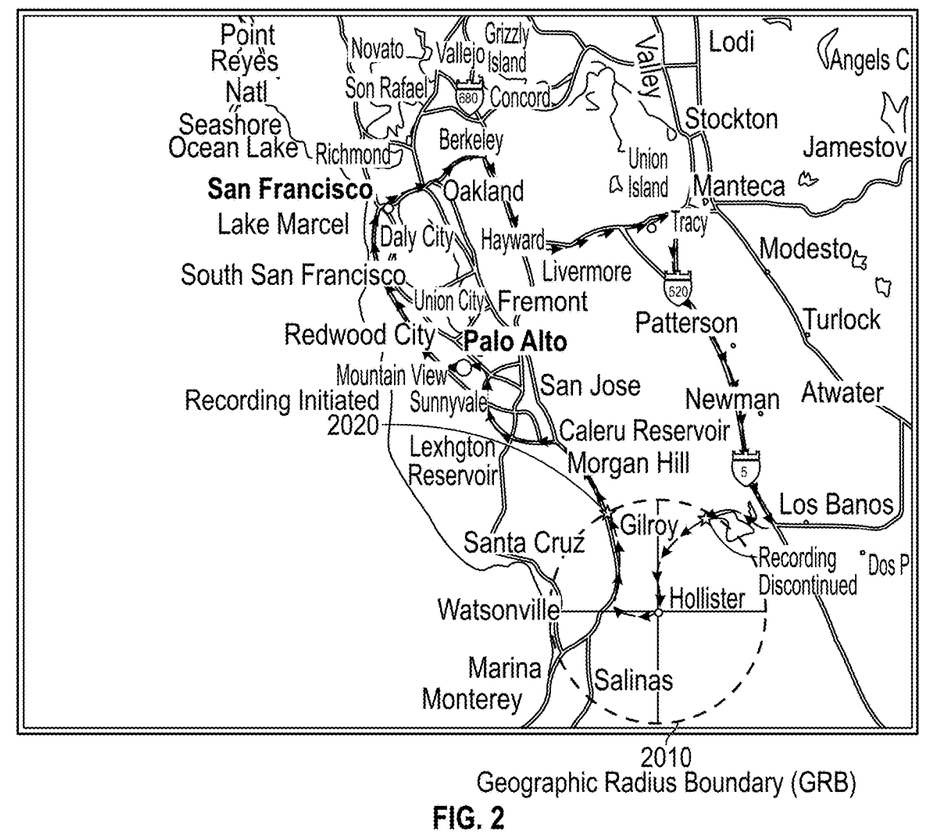
FIG. 2 is a map diagram illustrating an overview of a user device trip outside a geographic radius boundary, according to an embodiment.

FIG. 2 is a map diagram illustrating an overview of a user device trip outside a geographic radius boundary, according to an embodiment. In one embodiment, a client device 1010, such as a mobile phone, records a particular geographic radius boundary 2010 which is then used to automatically determine when the client device has crossed the boundary. Once outside the geographic radius boundary 2010, geo-tagged information from the client device will be recorded until the client device re-enters the boundary 2010. The client device will then display the information from the trip. Geo-tagged information can include, for example, ratings and reviews, photographs, or route information of certain locations visited while outside the boundary. The client device can organize trips into subsets which may be contained within a specific geographic area or expanded across a many geographic locations.

Figure 3:
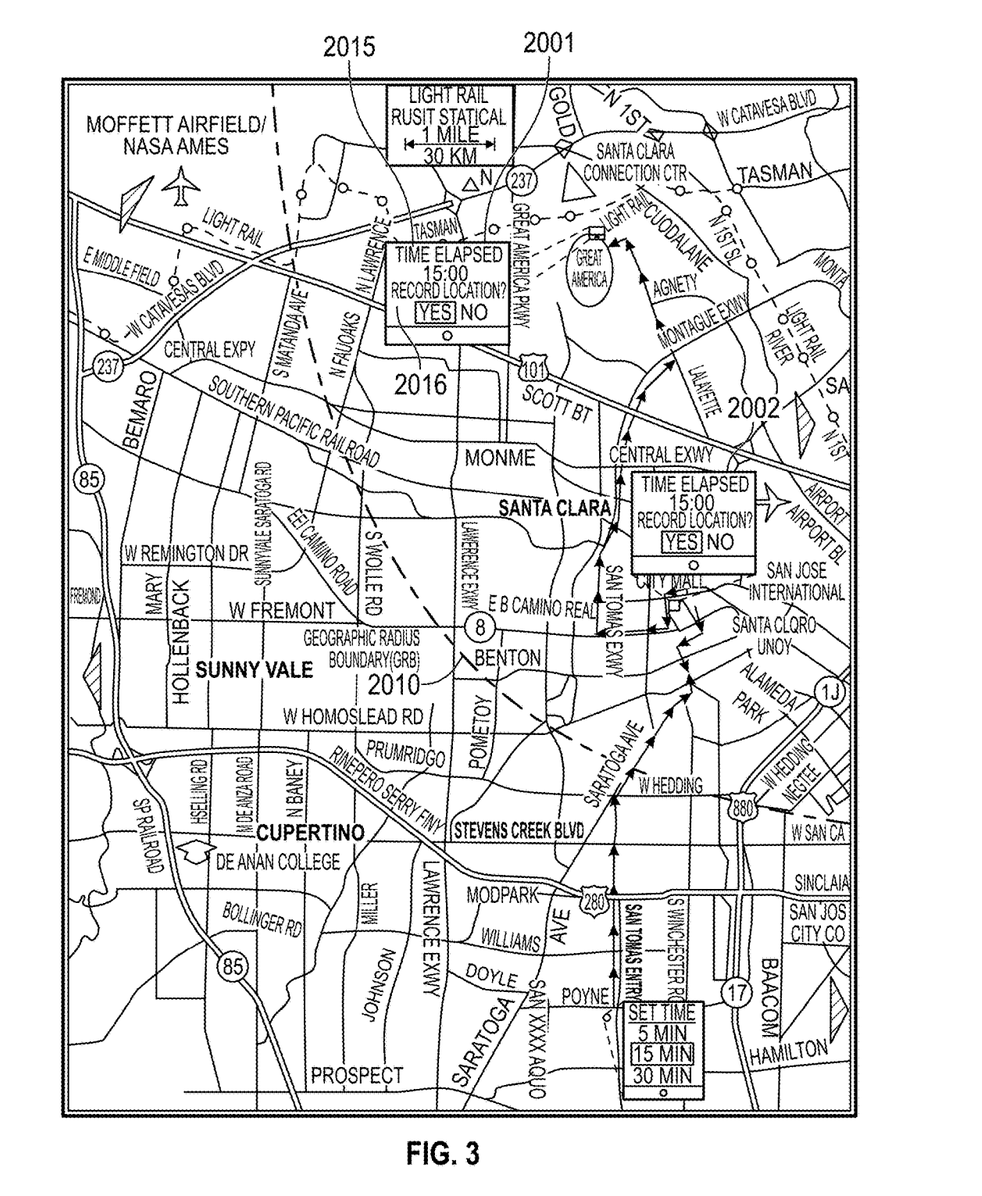
FIG. 3 is a map diagram illustrating an overview of user device geo-location recording after an elapsed time period, according to an embodiment.

FIG. 3 is a map diagram illustrating an overview of user device geo-location recording after an elapsed time period, according to an illustrative embodiment. In one embodiment, client device 1010 notifies a user the client device has not moved from a particular geo-location for a set elapsed time period, within a particular geographic boundary. If the client device has not moved out of a GRB 2010 for a particular elapsed time 2015, then the client device will ask the user if they want to record 2016 the current location 2001. Once the client device moves from the recorded location the client device will prompt the user to stop recording and display information about the visited location. The client device will prompt the user to share the trip via a social media platform. Geo-tagged information can include, for example, ratings and reviews, photographs, or route information of the visited location. In other embodiments, the activity of the client device within the geographic radius boundary is defined as a trip and can include, for example, one or more visited locations.

In one embodiment, a server compares the information of one client device with a plurality of client devices utilizing the application. The server, via a processing device, makes comparisons using particular criteria. The server generates a list, based on the plurality of client devices having similar travel patterns, and sends the list to the client device. The server determines matching characteristics and can include, for example, the type of location or attraction being visited (i.e. restaurant, park, mall, etc.). In other embodiments, information from the client device and plurality of client devices can be sent to the server anonymously and can be kept private or shared with the public.

Figure 4:
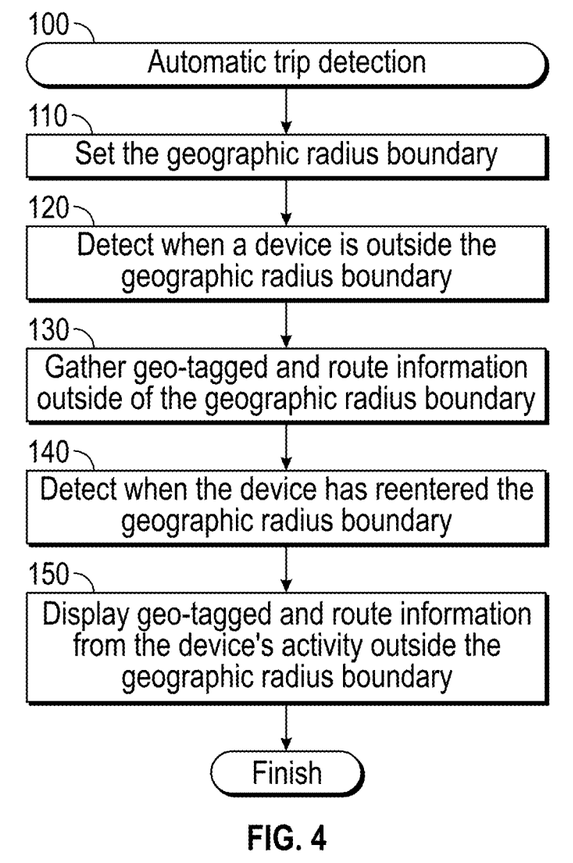
FIG. 4 is a flow diagram illustrating a method for recording and gathering information outside of a geographic radius boundary, according to an embodiment.
Figure 5:
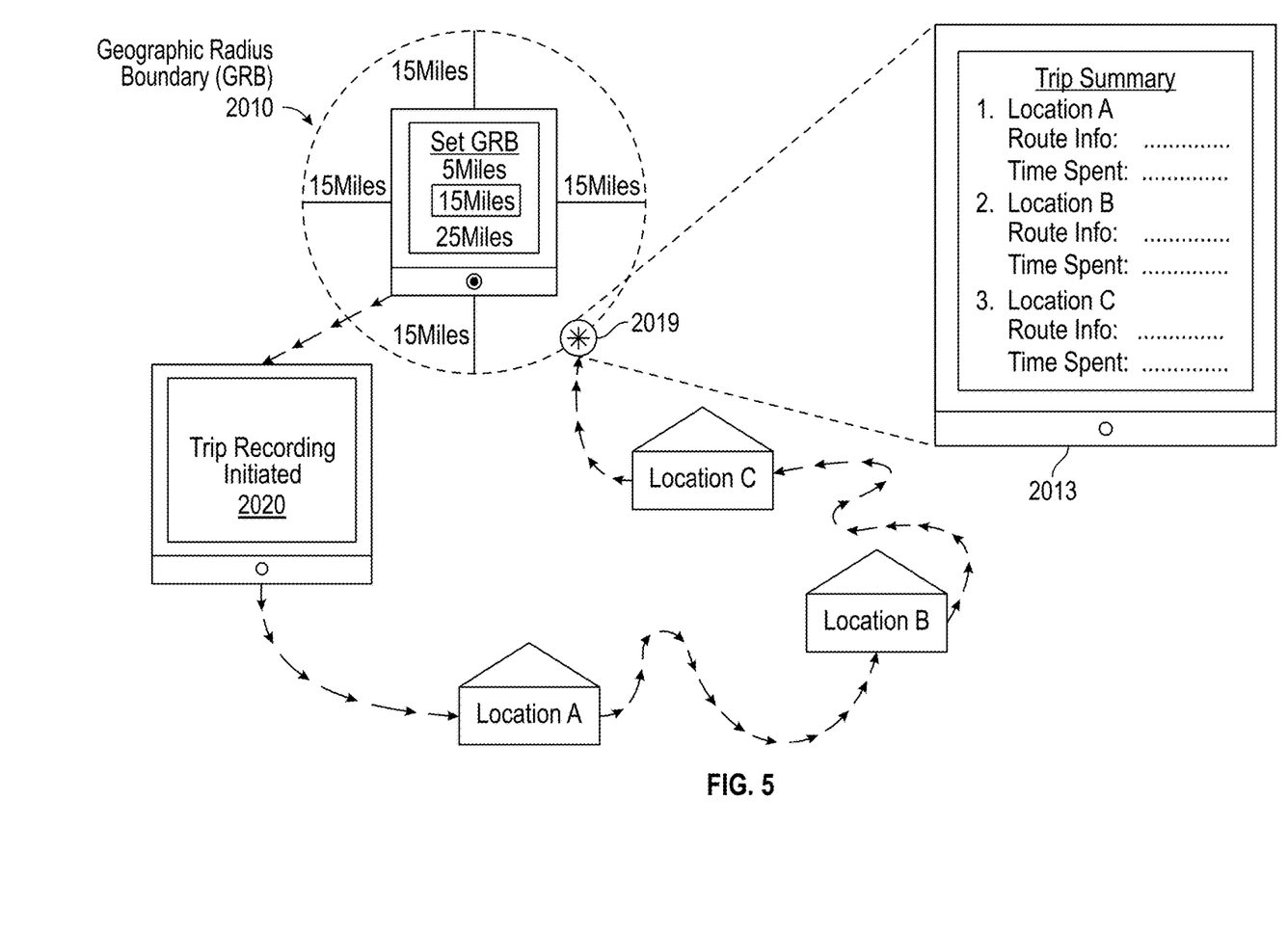
FIG. 5 is a drawing illustrating a method for recording and gathering information outside of a geographic radius boundary, according to an embodiment.

FIG. 4 is a flow diagram illustrating a method for recording and gathering information outside of a geographic radius boundary, according to an embodiment. FIG. 5 is a drawing illustrating a method for recording and gathering information outside of a geographic radius boundary, according to an embodiment. The method 100 may be performed by processing logic that comprises hardware (e.g. circuitry, dedicated logic, programmable logic, microcode, etc.), software (e.g., instructions run on a processing device to perform hardware simulation), or a combination thereof. The processing logic is configured to set a geographic radius boundary, detect when a device is outside of the predetermined geographic radius boundary, track and record device activity outside of the boundary, and determine when the device has returned within the boundary.

At block 410, method 400 sets the geographic radius boundary of the user devices. In one embodiment, the geographic radius boundary can be set as a distance, for example, 5 miles, 15 miles (selected in FIG. 5), 25 miles (as illustrated in FIG. 5) from the user devices forming the radius of the geographic radius boundary. In other embodiments, the user may select the geographic radius boundary 2010 to reflect a radial distance from their home base (e.g., home, apartment, office, etc.). The user devices may travel anywhere within the geographic radius boundary. A user may adjust or the geographic radius boundary based on changes to the set home base.

At block 420, method 400 detects when one of the user devices is outside of the geographic radius boundary. In one embodiment, the user devices continuously monitor their geo-location determining if they are within the bounds of the set geographic radius boundary. The user devices may travel anywhere within the geographic radius boundary and trip recording is initiated 2020 (illustrated as an example in FIGS. 2 and 5) once a user device crosses the geographic radius boundary 2010.

At block 430, the method gathers geo-tagged and route information of the user's devices outside of the geographic radius boundary. In one embodiment, a trip outside the geographic radius boundary begins automatically and can include, for example, information (e.g., route information, photographs, reviews, notes) about each place a user device records information (e.g., bars, restaurants, landmarks, venues). Information from the trip may be collected regardless of whether a user device records one visited location or many.

At block 440, method 400 detects when one of the user devices has reentered (2019 of FIG. 5) the geographic radius boundary. In one embodiment, the user devices continuously monitor their geo-location determining if they are within the bounds of the set geographic radius boundary. As long as a user device remains outside the geographic radius boundary, geo-tagged and other travel information is recorded and collected. Once a user device reenters the geographic radius boundary, recording and collecting of information is discontinued. In another embodiment, a user device may resume recording and collecting information if a user device is outside of the geographic radius boundary even after reentering.

At block 450, method 400 displays geo-tagged and route information from the user devices activity outside the geographic radius boundary. In one embodiment, the user is presented with a trip summary 2013 of recorded travel experiences while outside of the geographic radius boundary as illustrated, for example, in FIG. 5. Information may include pictures, route information, flight information, hotel information, and maps of locations. Information may be used for a historical perspective of past travel experiences including past routes and visited locations.

Figure 6:
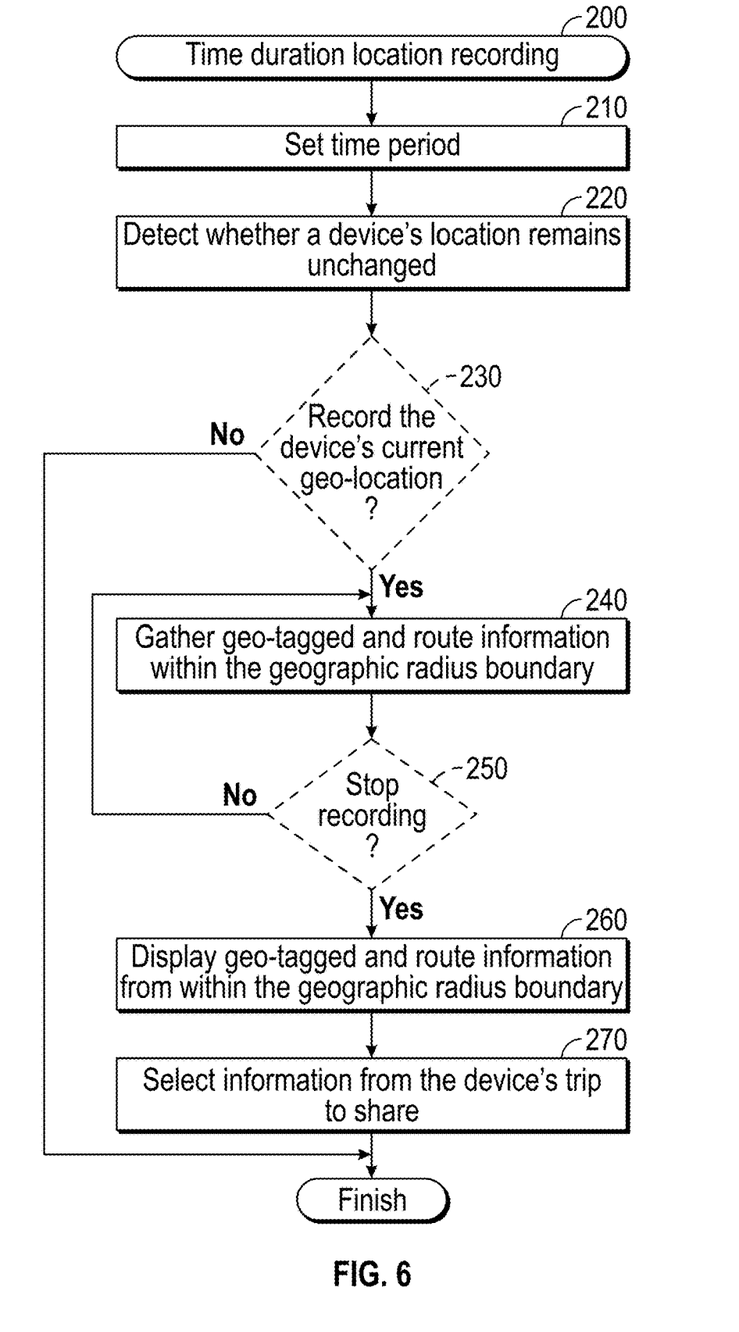
FIG. 6 is a flow diagram illustrating a method for recording a location within a geographic radius boundary after a particular elapsed time period, according to an embodiment.

FIG. 6 is a flow diagram illustrating a method for recording a location within a geographic radius boundary after a particular elapsed time period, according to an embodiment. The method 600 may be performed by processing logic that comprises hardware (e.g., circuitry, dedicated logic, programmable logic, microcode), software (e.g., instructions run on a processing device to perform hardware simulation), or a combination thereof. The processing logic is configured to set a time period in which to record a location of a user device after the time period has elapsed, gather geo-tagged information until the user device stops recording, and display the geo-tagged information from the recorded location.

Referring to FIG. 6, at block 610, method 600 receives a time period selection from the user. In one embodiment, the time period (e.g., 5 minutes, 15 minutes, 30 minutes) is determined as an indication of an elapsed time period in which to record the location of a user device within a geographic radius boundary (e.g., as illustrated by location 2001 in FIG. 3). The user may decide to change the initially set time period based on individual preference of a longer or shorter elapsed time period.

At block 620, method 600 detects whether the location of a user device has remained unchanged for the determined time period. In one embodiment, the user device monitors when the location of the user device has remained unchanged within the geographic radius boundary and the specified time period has elapsed. If the time period has expired and the location of the user device has remained in the same location within the geographic radius boundary (as illustrated by locations 2001 and 2002 in FIG. 3), then the user device has determined that user may want to record this particular location (e.g., bar, restaurant, venue). In other embodiments, the determined time period will only begin to count down when the location of the user device remains unchanged. As soon as the user device moves from the current geo-location, the time period will reset until the user has remained at a particular geo-location for the selected time period.

At block 630, method 600 determines whether the user of the user device wants to record their current geo-location. In one embodiment, once the location of the user device has remained unchanged within the geographic radius boundary for the duration of the specified time period, the user is prompted to record the current geo-location of the user device. If the user does not record their current geo-location, then the method 600 will finish without gathering any information from the user device.

If the user chooses to record current geo-location of the user device, at block 640, method 600 begins gathering geo-tagged and route information at the current location of the user's devices within geographic radius boundary. In one embodiment, information gathered from the geo-location of the user device can include, for example, information (e.g., route information, photographs, reviews, notes) about the current geo-location of the user device (e.g., bars, restaurants, landmarks, venues).

At block 650, method 600 determines whether to stop recording information gathered from the current geo-location of the user device. In one embodiment, once the user has selected to record the current geo-location of the user device, the user device monitors for a change in the geo-location. If the geo-location of the user device changes, the user device prompts the user to discontinue the gathering of information by the user device.

If the user device ceases the recording of information, at block 660, method 600 displays geo-tagged and route information from the recorded geo-location of the user device within geographic radius boundary. In one embodiment, the user device presents a summary of the experience of the user at the recorded geo-location. Information may include pictures, route information, flight information, hotel information, and maps of geo-locations. Information is used for a historical perspective of past travel experiences including past routes and visited locations. Past travel information of the user device may be used to determine if the recorded geo-location may be classified as a new trip. If the location has been previously visited the trip may be classified into an existing trip, depending on the preferences of the user device.

Figure 7:
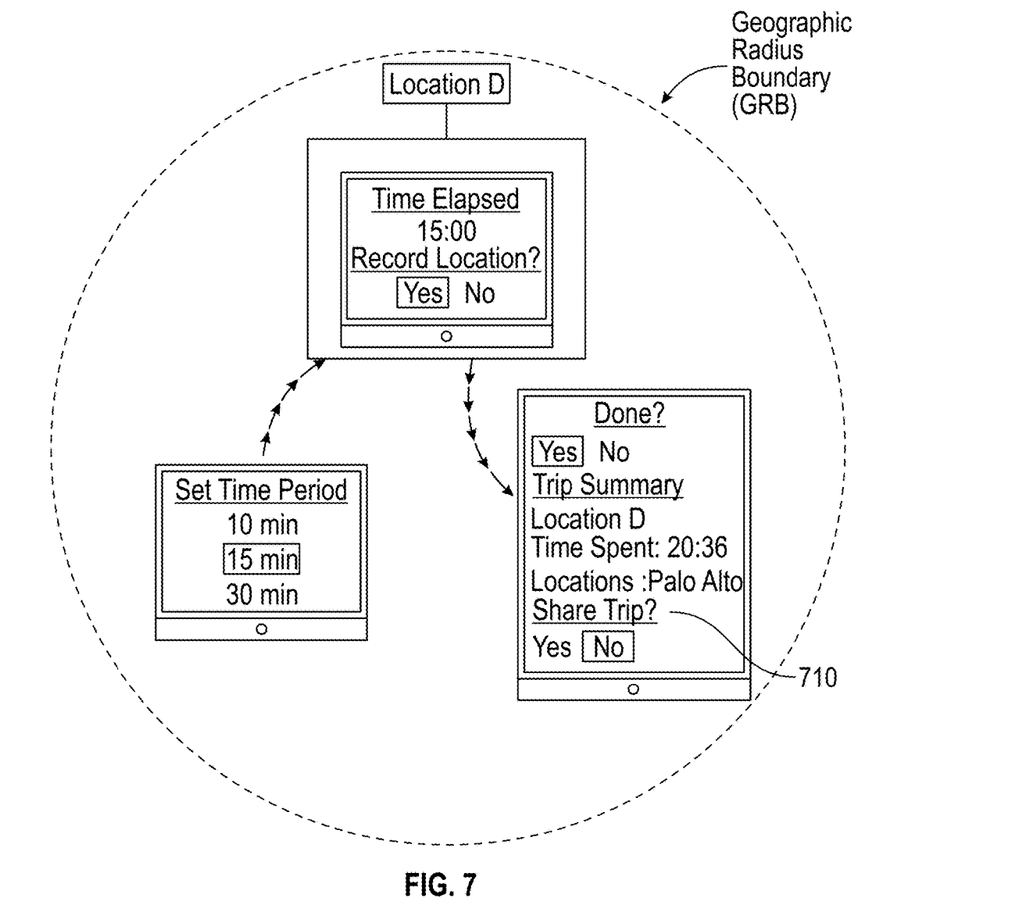
FIG. 7 is a drawing illustrating a method for recording and gathering information outside of a geographic radius boundary, according to an embodiment.

At block 670, method 600 determines whether to share information from the user device as illustrated in FIG. 7. In one embodiment, the user device may share information 710 from the recorded geo-location, for example, via a social media platform or other communication channels. A user may share the information with a specific group of contacts. In other embodiments, a user may choose not to share any information from the recorded location and keep it private.

Figure 8:
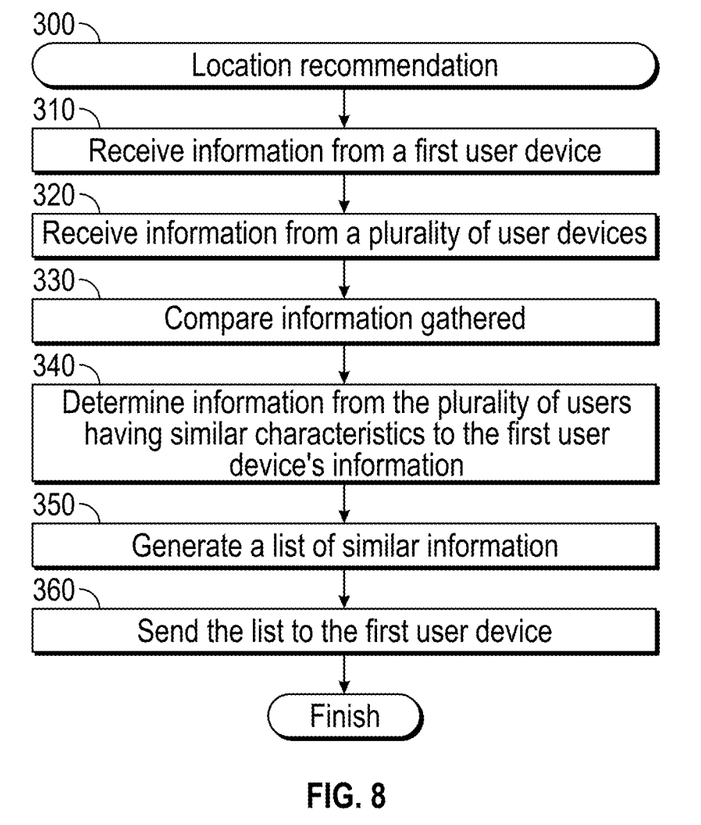
FIG. 8 is a flow diagram illustrating a method for aggregating information from users of the application to recommend future locations for a user to visit, according to an embodiment.

FIG. 8 is a flow diagram illustrating a method for aggregating information from users of the application to recommend future locations for a user to visit, according to an embodiment. The method 800 may be performed by processing logic that comprises hardware (e.g., circuitry, dedicated logic, programmable logic, microcode), software (e.g., instructions run on a processing device to perform hardware simulation), or a combination thereof. The processing logic is configured to receive information from user devices and a plurality of user devices, compare the information, determine similar characteristics, and generate a list of information having similar characteristics to send to the user devices.

Referring to FIG. 8, at block 810, method 800 receives information from devices of a first user. In one embodiment, a server receives information from devices of a first user. Information may include, for example, locations visited, route information, photographs, ratings, reviews, and notes gathered from the travel history of the user devices. The user may choose to share information from the user devices anonymously with the application server. A user may also choose particular information eligible for sharing with the application server.

At block 820, method 800 receives information from a plurality of user devices. In one embodiment, the server receives information from the plurality of user devices registered with the application. Information may include, for example, locations visited, route information, photographs, ratings, reviews, and notes gathered from the travel history of the plurality of user devices. The plurality of users may choose to share information anonymously with the application server. They may also choose particular information to make available for the application server.

Figure 9:
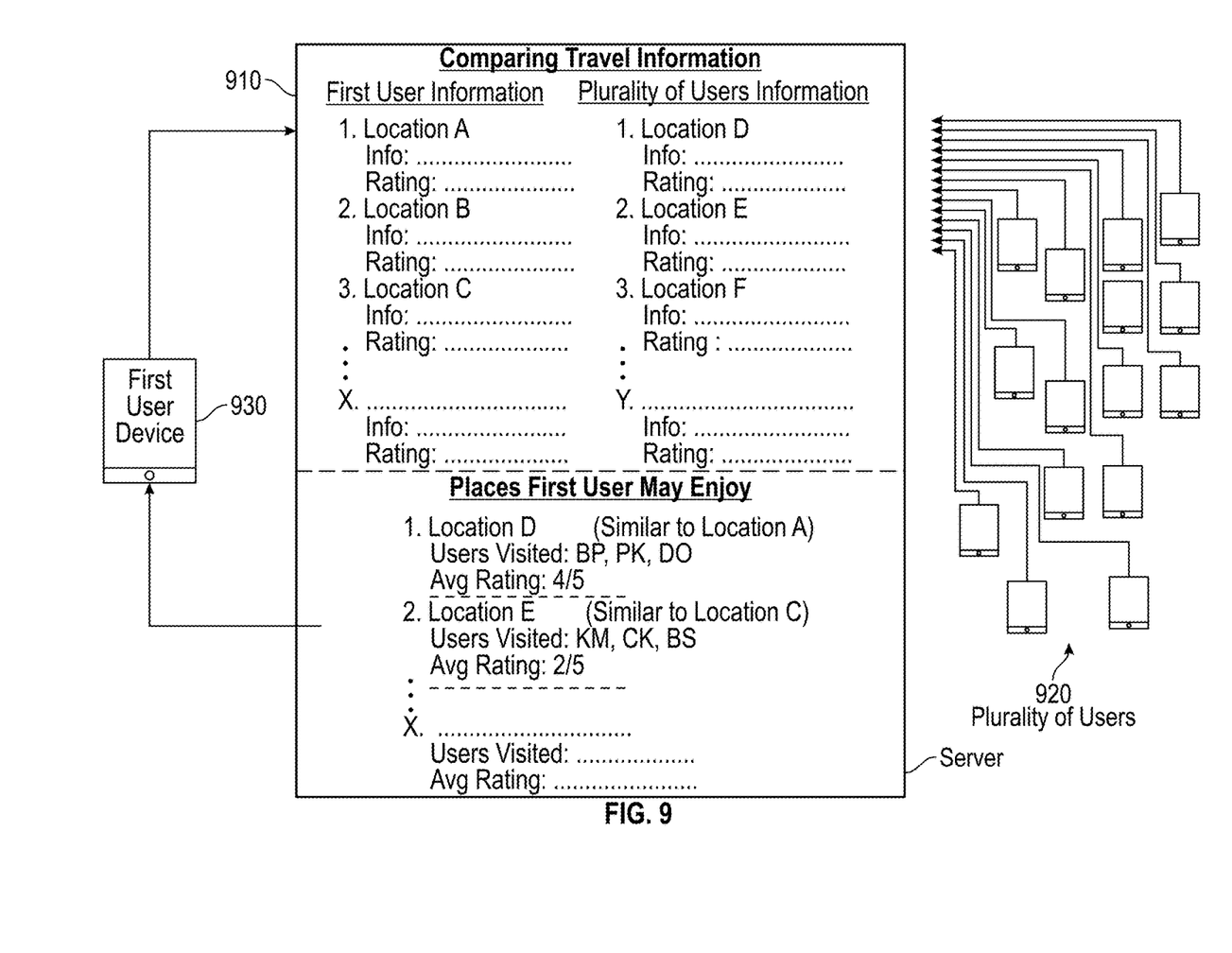
FIG. 9 is a drawing illustrating a method for recording a location within a geographic radius boundary after a particular elapsed time period, according to an embodiment.

At block 830, method 800 compares the collected information. In one embodiment, information gathered from the devices of the first user 930 is compared 910 to the information obtained from the plurality of user devices 920 as illustrated in FIG. 9.

At block 840, method 800 determines information having similar characteristics. In one embodiment, information from the devices of the first user is analyzed with information from the plurality of user devices in order to determine which geo-locations the first user may want to visit based on past travel experiences. Characteristics may include, for example, geo-locations visited, route information, photographs, reviews, and notes.

At block 850, method 800 generates a list of information from the plurality of user devices having similar characteristics with the devices of the first user. In one embodiment, the information from the plurality of user devices determined to be similar to the devices of the first user, is placed in a list format by the application server. The list is ranked by the application server according to the most likely locations the first user might desire to visit in the future.

At block 860, method 800 sends the list of information to the devices of the first user. In one embodiment, the list of information having similar characteristics, generated by the application server, is forwarded to the devices of the first user.

Figure 10:
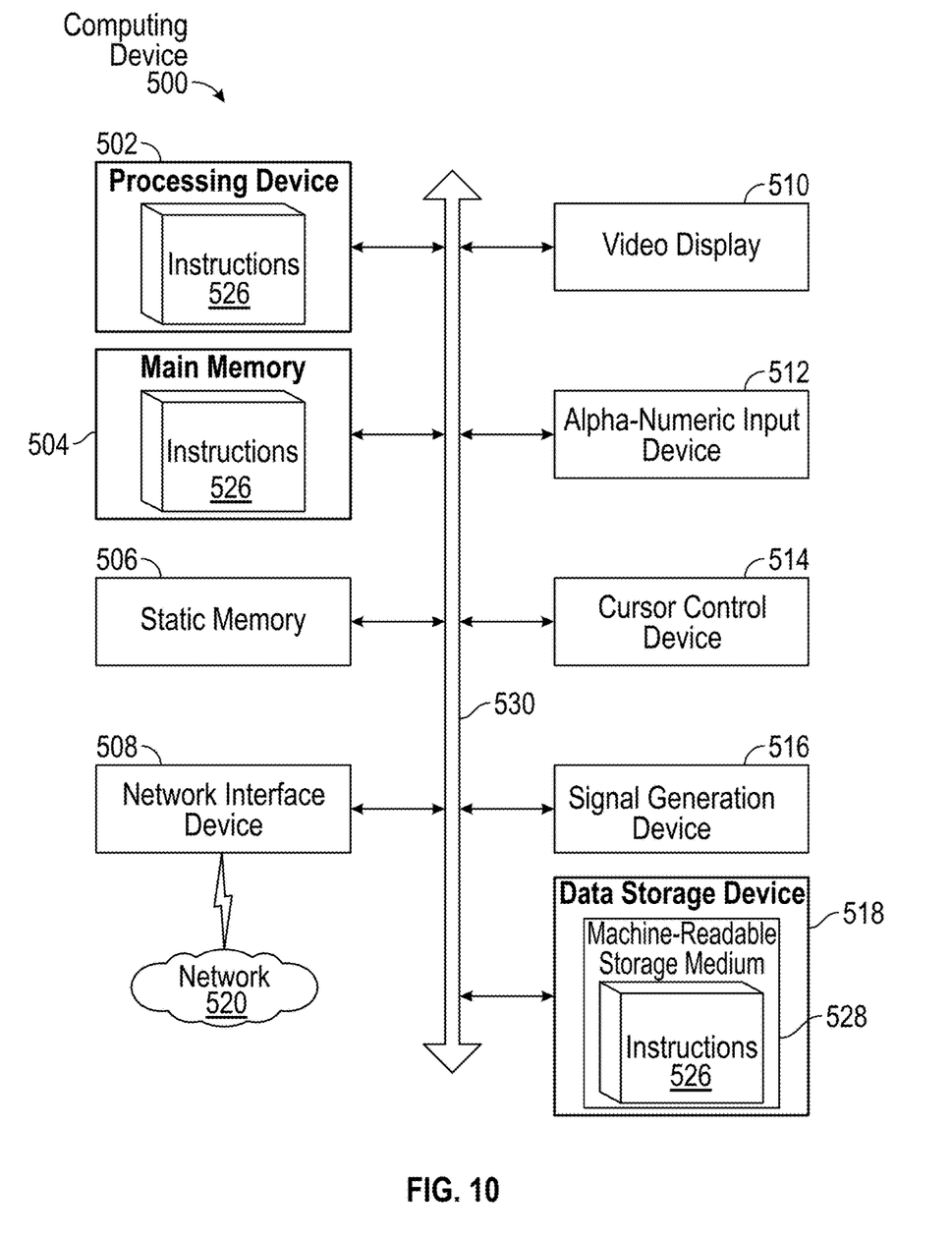
FIG. 10 is a block diagram of an example computing device that may perform one or more of the operations described herein, in accordance with some embodiments of the present disclosure.

FIG. 10 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server (e.g., 1020) machine in client-server network environment or in the capacity of a client (e.g., 1010) in either a client-server or peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein. In one embodiment, processing device 502 represents processing device 120 of FIG. 1. In another embodiment, processing device 502 represents a processing device of a client device (e.g., client device 150 of FIG. 1).

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may represent data sources 1011 or database 1021 and may include a computer-readable storage medium 528 on which may be stored one or more sets of instructions, e.g., instructions for carrying out the operations described herein, in accordance with one or more aspects of the present disclosure. Instructions implementing module 526 may also reside, completely or at least partially, within main memory 504 and/or within processing device 502 during execution thereof by computing device 500, main memory 504 and processing device 502 also constituting computer-readable media. The instructions may further be transmitted or received over a network 520 (e.g., which may represent network 1030 of FIG. 1) via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   determining, by a processing device, a time period during which to record a geo-location of one or more user devices in response to the one or more user devices remaining within a certain geographic radius boundary around the geo-location;
   querying the user of the one or more user devices, by the processing device, to record a first geo-location when a location of the one or more devices has remained unchanged within the geographic radius boundary for the time period;
   querying the user of the one or more user devices to stop recording the first geo-location in response to the one or more user devices having moved from the first geo-location;
   discontinuing the recording of the first geo-location of the one or more user devices in response to receiving an indication to stop recording;
   causing display of geo-tagged information of the one or more user devices within the geographic radius boundary after the recording is discontinued; and
   querying the user of the one or more user devices to share recorded geo-tagged information.

2. The method of claim 1, wherein the geo-tagged information further comprises at least one of geo-tagged photographs, ratings and reviews of geo-tagged locations and landmarks, and routes collected at the recorded geo-location within the geographic radius.

3. The method of claim 1, wherein activity of the one or more user devices within the geographic radius boundary for a duration of time is defined as a trip.

4. The method of claim 1, wherein web information relating to a restaurant review associated with the geo-location of the one or more user devices may be displayed to the user of the one or more user devices.

5. The method of claim 1, wherein the user of the one or more user devices may share geo-tagged information and route information publicly via a social media platform, or share with a particular group of contacts on one or more devices of the user, or not share any geo-tagged information.

6. The method of claim 1, wherein querying the user of the one or more user devices to record the current geo-location is based on previous travel information of the one or more user devices and may be classified as at least a new or existing trip.

7. An apparatus comprising:
   a memory; and
   a processing device, operatively coupled to the memory, to:
   determine a time period during which to record a geo-location of one or more user devices in response to the one or more user devices remaining within a certain geographic radius boundary around the geo-location;
   query the user of the one or more user devices, by the processing device, to record a first geo-location when a location of the one or more devices has remained unchanged within the geographic radius boundary for the time period;
   query the user of the one or more user devices to stop recording the first geo-location in response to the one or more user devices having moved from the first geo-location;
   discontinue the recording of the first geo-location of the one or more user devices in response to receiving an indication to stop recording;
   cause display of geo-tagged information of the one or more user devices within the geographic radius boundary after the recording is discontinued; and
   query the user of the one or more user devices to share recorded geo-tagged information.

8. The apparatus of claim 7, wherein the geo-tagged information further comprises at least one of geo-tagged photographs, ratings and reviews of geo-tagged locations and landmarks, and routes collected at the recorded geo-location within the geographic radius.

9. The apparatus of claim 7, wherein activity of the one or more user devices within the geographic radius boundary for a duration of time is defined as a trip.

10. The apparatus of claim 7, wherein web information relating to a restaurant review associated with the geo-location of the one or more user devices may be displayed to the user of the one or more user devices.

11. The apparatus of claim 7, wherein the user of the one or more user devices may share geo-tagged information and route information publicly via a social media platform, or share with a particular group of contacts on one or more devices of the user, or not share any geo-tagged information.

12. The apparatus of claim 7, wherein querying the user of the one or more user devices to record the current geo-location is based on previous travel information of the one or more user devices and may be classified as at least a new or existing trip.

13. A non-transitory computer-readable storage medium including instructions that, when executed by a processing device, cause the processing device to:
   determine, by the processing device, a time period during which to record a geo-location of one or more user devices in response to the one or more user devices remaining within a certain geographic radius boundary around the geo-location;
   query the user of the one or more user devices, by the processing device, to record a first geo-location when a location of the one or more devices has remained unchanged within the geographic radius boundary for the time period;

query the user of the one or more user devices to stop recording the first geo-location in response to the one or more user devices having moved from the first geo-location;

discontinue the recording of the first geo-location of the one or more user devices in response to receiving an indication to stop recording;

cause display of geo-tagged information of the one or more user devices within the geographic radius boundary after the recording is discontinued; and query the user of the one or more user devices to share recorded geo-tagged information.

14. The non-transitory computer-readable storage medium of claim 13, wherein the geo-tagged information further comprises at least one of geo-tagged photographs, ratings and reviews of geo-tagged locations and landmarks, and routes collected at the recorded geo-location within the geographic radius.

15. The non-transitory computer-readable storage medium of claim 13, wherein activity of the one or more user devices within the geographic radius boundary for a duration of time is defined as a trip.

16. The non-transitory computer-readable storage medium of claim 13, wherein web information relating to a restaurant review associated with the geo-location of the one or more user devices may be displayed to the user of the one or more user devices.

17. The non-transitory computer-readable storage medium of claim 13, wherein the user of the one or more user devices may share geo-tagged information and route information publicly via a social media platform, or share with a particular group of contacts on one or more devices of the user, or not share any geo-tagged information.

18. The non-transitory computer-readable storage medium of claim 13, wherein querying the user of the one or more user devices to record the current geo-location is based on previous travel information of the one or more user devices and may be classified as at least a new or existing trip.

* * * * *